United States Patent
Parellada Armela et al.

(10) Patent No.: US 11,246,380 B2
(45) Date of Patent: Feb. 15, 2022

(54) MALE TOUCH FASTENER ELEMENTS

(71) Applicant: Velcro IP Holdings LLC, Manchester, NH (US)

(72) Inventors: Luis Parellada Armela, Palafrugell (ES); Christopher M. Gallant, Nottingham, NH (US); James L. Tardiff, Manchester, NH (US); Mark A. Clarner, Hopkinton, NH (US)

(73) Assignee: Velcro IP Holdings LLC, Manchester, NH (US)

(*) Notice: Subject to any disclaimer, the term of this patent is extended or adjusted under 35 U.S.C. 154(b) by 56 days.

(21) Appl. No.: 16/699,790

(22) Filed: Dec. 2, 2019

(65) Prior Publication Data
US 2020/0170356 A1 Jun. 4, 2020

Related U.S. Application Data

(60) Provisional application No. 62/774,459, filed on Dec. 3, 2018.

(51) Int. Cl.
*A44B 18/00* (2006.01)

(52) U.S. Cl.
CPC ...... *A44B 18/0019* (2013.01); *A44B 18/0011* (2013.01)

(58) Field of Classification Search
CPC .................. A44B 18/0019; A44B 18/0011
See application file for complete search history.

(56) References Cited

U.S. PATENT DOCUMENTS

| | | | | |
|---|---|---|---|---|
| 3,900,652 | A | * | 8/1975 | Uraya ................ A44B 18/0019 428/92 |
| 4,216,257 | A | * | 8/1980 | Schams ............. A44B 18/0019 428/93 |
| 4,454,183 | A | * | 6/1984 | Wollman .......... A44B 18/0042 24/306 |
| 4,770,917 | A | * | 9/1988 | Tochacek ................. B32B 5/02 428/95 |

(Continued)

FOREIGN PATENT DOCUMENTS

| | | |
|---|---|---|
| EP | 3395193 | 10/2018 |
| EP | 3395194 | 10/2018 |
| EP | 3395195 | 10/2018 |

OTHER PUBLICATIONS

PCT 2nd Written Opinion in International Appln. No. PCT/EP2019/083123, dated Jan. 14, 2021, 6 pages.

(Continued)

*Primary Examiner* — Jason W San
(74) *Attorney, Agent, or Firm* — Fish & Richardson P.C.

(57) ABSTRACT

A male touch fastener product with a resin surface and an array of spaced-apart male touch fastener elements carried on the surface. Each touch fastener element has a stem extending from the surface and a head disposed at a distal end of the stem and extending laterally from the stem to a distal edge overhanging the surface. The head, stem and surface form a contiguous mass of resin, the head. The distal edge has multiple toes extending laterally outward and varying in shape and size about the edge, with adjacent toes having facing, free-form resin surfaces defining crevices therebetween. The fastener element is particularly flexible and engages with very fine fibers.

16 Claims, 10 Drawing Sheets

(56) References Cited

U.S. PATENT DOCUMENTS

| | | | | |
|---|---|---|---|---|
| 5,032,122 A * | 7/1991 | Noel | | A61F 13/627 604/391 |
| 5,625,929 A * | 5/1997 | Hattori | | A44B 18/0053 24/452 |
| 6,248,276 B1 * | 6/2001 | Parellada | | A44B 18/0049 264/167 |
| 6,678,924 B2 * | 1/2004 | Murasaki | | A44B 18/0049 24/306 |
| 6,687,962 B2 * | 2/2004 | Clarner | | A44B 18/0053 24/442 |
| 6,708,378 B2 * | 3/2004 | Parellada | | A44B 18/0049 24/304 |
| 6,991,843 B2 * | 1/2006 | Armela | | A44B 18/0049 428/120 |
| 7,727,440 B2 | 6/2010 | Armela et al. | | |
| 8,819,902 B2 * | 9/2014 | Tuma | | A44B 18/0007 24/450 |
| 2003/0074771 A1 * | 4/2003 | Duffy | | A44B 18/0061 24/442 |
| 2004/0074071 A1 * | 4/2004 | Golden | | B64C 33/02 24/442 |
| 2004/0119193 A1 | 6/2004 | Parellada et al. | | |
| 2004/0258902 A1 * | 12/2004 | Seth | | A61F 13/0273 428/315.7 |
| 2007/0063375 A1 * | 3/2007 | Tuma | | A44B 18/0065 264/166 |
| 2009/0126166 A1 * | 5/2009 | Tuma | | A44B 18/0065 24/452 |
| 2010/0136281 A1 * | 6/2010 | Sitti | | C09J 7/00 428/92 |
| 2011/0265292 A1 * | 11/2011 | Kirby | | A44B 18/0096 24/451 |
| 2012/0267033 A1 * | 10/2012 | Mueller | | A44B 18/008 156/66 |
| 2013/0000085 A1 * | 1/2013 | Cina | | A44B 18/0076 24/450 |
| 2013/0067702 A1 * | 3/2013 | Tuma | | A44B 18/0049 24/450 |
| 2013/0125353 A1 * | 5/2013 | Tuma | | C09J 7/00 24/442 |
| 2014/0103567 A1 * | 4/2014 | Collins | | B29C 43/46 264/167 |
| 2014/0349079 A1 * | 11/2014 | Chandrasekaran | | A44B 18/0049 428/159 |
| 2015/0074956 A1 * | 3/2015 | Marche | | A44B 18/0065 24/442 |
| 2015/0275941 A1 * | 10/2015 | Nisogi | | A44B 18/0042 403/364 |
| 2017/0020236 A1 * | 1/2017 | Rocha | | A44B 18/0073 |
| 2019/0053582 A1 * | 2/2019 | Gallant | | A44B 18/0069 |
| 2020/0170356 A1 * | 6/2020 | Parellada Armela | | A44B 18/0019 |

OTHER PUBLICATIONS

PCT 2nd Written Opinion in International Appln. No. PCT/EP2019/083123, dated Nov. 9, 2020, 7 pages.

PCT International Search Report and Written Opinion in International Application No. PCT/EP2019/083123, dated Feb. 12, 2020, 11 pages.

Toccare User Manual, Software Version 5.0, SynTouch Inc. (ed.), 2018, 46 pages.

* cited by examiner

MALE TOUCH FASTENER ELEMENTS

TECHNICAL FIELD

This invention relates to touch fastener elements, and more particularly to molded touch fastener elements of the mushroom type.

BACKGROUND

Touch fasteners are useful for releasable engagement of surfaces in products ranging from diapers to construction materials. In most cases, the engagement is between an array of very small male fastener elements and a field of fibers or loops, but in some cases heads of the male fastener elements can be shaped and spaced so as to releasably engage a similar array. Some male fastener elements have heads that overhang along only one lateral direction, while others overhang in multiple directions (or in all directions). The former (often referred to as J-shaped or palm tree fasteners) tend to have very directional engagement characteristics, whereas the latter (often referred to as mushroom-shaped fasteners) have engagement characteristics that are more uniform in all directions. Each type of male fastener element has its preferred uses in commercial products. Mushroom-shaped fastener elements can be made with fairly thin heads, for engagement with very low loft fibers as tend to be found in inexpensive non-woven materials. Improvements in fastener element shape, and in methods of making such shapes, are continually sought.

SUMMARY

Various aspects of the invention feature a male touch fastener product with a resin surface and an array of spaced-apart male touch fastener elements carried on the surface. Each touch fastener element has a stem extending from the surface, and a head disposed at a distal end of the stem, the head forming with the stem and the surface a contiguous mass of resin. The head extends from the stem to a distal edge overhanging the surface.

According to one aspect of the invention, the distal edge has multiple toes extending laterally outward and varying in shape and size about the edge, with adjacent toes having facing, free-form resin surfaces defining crevices between them, the crevices being narrower than the adjacent toes. In some examples, the distal edge has between 5 and 50 toes, and in some cases, between 10 and 30 toes. Preferably, there are between 30 and 100 toes per millimeter of head perimeter. In some embodiments, at least one of the crevices is defined between toe surfaces that are generally parallel over at least 30 percent of an overall length of the crevice.

Another aspect of the invention features a touch fastening having a fibrous surface having exposed fibers, and the male touch fastener product as recited above releasably engaged with the fibrous surface, with fibers of the fibrous surface snagged in crevices between toes of the heads.

According to another aspect of the invention, the array has at least one row of the male touch fastener elements arranged such that heads of adjacent fastener elements of the row are spaced from each other a distance that is between 1.2 and 2.0 times (preferably between 1.4 and 1.8 times) a minimum lateral dimension of the stems of the adjacent fastener elements. Preferably, for at least most of the fastener elements of the array the ratio of a difference between overall lateral extent of the head and a minimum lateral extent of the stem to the overhang midpoint thickness is between 1.0 and 5.0 (preferably between 1.4 and 2.0).

According to another aspect of the invention, the stem has a minimum lateral extent and a bend height defined as the perpendicular distance from the resin surface to a lowermost occurrence of the minimum lateral extent. For at least most of the fastener elements of the array, the product of Stem Bending Coefficient and Edge Flex Ratio (as those terms are defined below) is between 3.0 and 10.0, where Stem Bending Coefficient is a ratio of a difference between overall height and bend height to the minimum lateral extent of the stem, and Edge Flex Ratio is a ratio of a difference between the overall lateral extent of the head and the minimum lateral extent of the stem to the overhang midpoint thickness.

According to another aspect of the invention, for at least most of the fastener elements of the array, the ratio of Edge Flex Ratio to Stem Bending Coefficient is between 0.3 and 6.0 (preferably between 0.5 and 5).

According to yet another aspect of the invention, at least three adjacent fastener elements each has a Stem Bending Coefficient of between 1.4 and 2.0.

In any of these aspects, the product preferably exhibits a Toccare micro-texture coarseness, as measured on the array, of between 20 and 30, and/or a Toccare micro-texture roughness, as measured on the array, of between 25 and 40. Toccare is a trademark of SynTouch Inc.

According to another aspect of the invention, the product exhibits a Toccare micro-texture coarseness, as measured on the array, of between 20 and 30.

According to yet another aspect of the invention, the product exhibits a Toccare micro-texture roughness, as measured on the array, of between 25 and 40.

Embodiments according to any of the above aspects may be provided with any combination of the following features.

In some cases, the stem has a molded peripheral surface. In some examples, the head has a molded underside surface.

In some embodiments, the stem is of round cross-section and/or extends perpendicular to the resin surface.

In some examples, the head is disc-shaped.

The array preferably has a density of between 1300 and 5500 fastener elements per square centimeter, and the fastener elements preferably each extend to an overall height from the resin surface of between about 0.08 and 0.3 millimeter.

In some cases, the head has an essentially flat upper surface. In some examples, the head has an upper surface defining a central depression.

The head may have a nominal thickness, for example, of between 0.01 and 0.04 millimeter.

In some embodiments, the head has an underside surface that defines a curve extending from a narrowest portion of the stem to the rim of the head. For example, the curve may follows an arc with a radius greater than half a lateral extent of a lateral cross-section of the narrowest portion of the stem.

In some configurations, the array has staggered rows of fastener elements. For example, each head may be essentially equally spaced from each of six other heads.

In some cases, the array defines a regular row spacing.

The resin surface may be of a resin base having a thickness less than about 0.1 millimeter, for example. In some cases, the resin base is laminated to a web, and may be surrounded by exposed web surface to form an island of resin. In some examples, the web comprises fabric.

Another aspect of the invention features a method of forming a male touch fastener product. The method includes molding a resin surface while forming an array of spaced-apart male touch fastener elements extending from the surface, by pressing moldable resin into respective molding cavities defined in a mold against which mold the resin surface is molded, solidifying the pressed resin in the molding cavities, and then stripping the solidified resin from the cavities as stems with associated heads disposed at distal ends of the stems and overhanging the surface. As stripped from the cavities the heads have distal edges with multiple toes extending laterally outward and varying in shape and size about the edge, with adjacent toes having facing, free-form resin surfaces defining crevices between them, each crevice narrower than the adjacent toes.

In some embodiments, an innermost portion of each cavity is bounded by a smooth rim surface. In some cases, each cavity is defined by a surface against which an underside of the head is formed and defines a curve extending from a point forming a narrowest portion of the stem to the rim surface. Preferably the curve follows an arc with a radius greater than half a lateral extent of a lateral cross-section of the cavity at the point forming the narrowest portion of the stem.

In some examples the mold features a rotatable mold roll, and the method is performed continually during rotation of the mold roll to produce an elongated flexible fastener product.

In some cases the method also includes, after forming the array of spaced-apart male touch fastener elements, plastically stretching the resin surface.

The fastener elements described herein can be formed at very high speeds in the production of inexpensive fastener products. Moreover, due in part to their size, arrangement and specific design features, arrays of such fastener elements can be made to exhibit particularly advantageous levels of softness to the human touch. In some cases such arrays can be formed on resin sheets such that it can be difficult for a layperson to tell which side of the sheet is the fastening surface, without engaging the surface with fibers.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
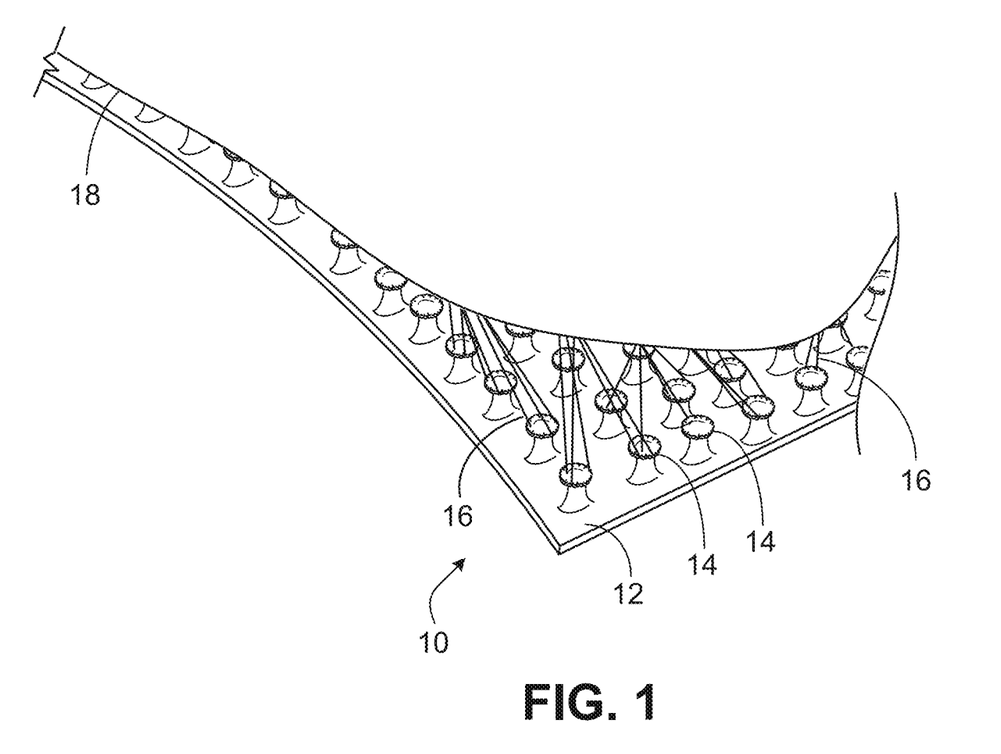
FIG. 1 is an enlarged, partial perspective view of a touch fastener being separated.

Referring first to FIG. 1, fastener product 10 has a base sheet 12 of resin and an array of male touch fastener elements 14 extending from a broad resin side surface 16 of the base sheet. To give some proportion, base sheet 12 is about 60 μm hick and can be up to one meter or more in width, and can be manufactured in continuous length and rolled for transport. The fastener elements are arranged in an array on the base sheet surface, with a density of about 2700 per square centimeter, each fastener element extending only about 0.125 mm from the base sheet surface. The fastener elements, which are not shown to scale, are illustrated as having snagged very fine fibers 16 of a mating sheet 18 of material, such that as the two mated materials are peeled away from one another, the snagged fibers are stretched taut prior to being released. In this manner the two materials together form a releasable fastening. The fibers the fastener elements are designed to snag and retain are extremely fine, as will be discussed in more detail below, making fastener product 10 particularly useful in snagging very low-loft knit materials, such as those formed of cotton or silk.

Figure 2:
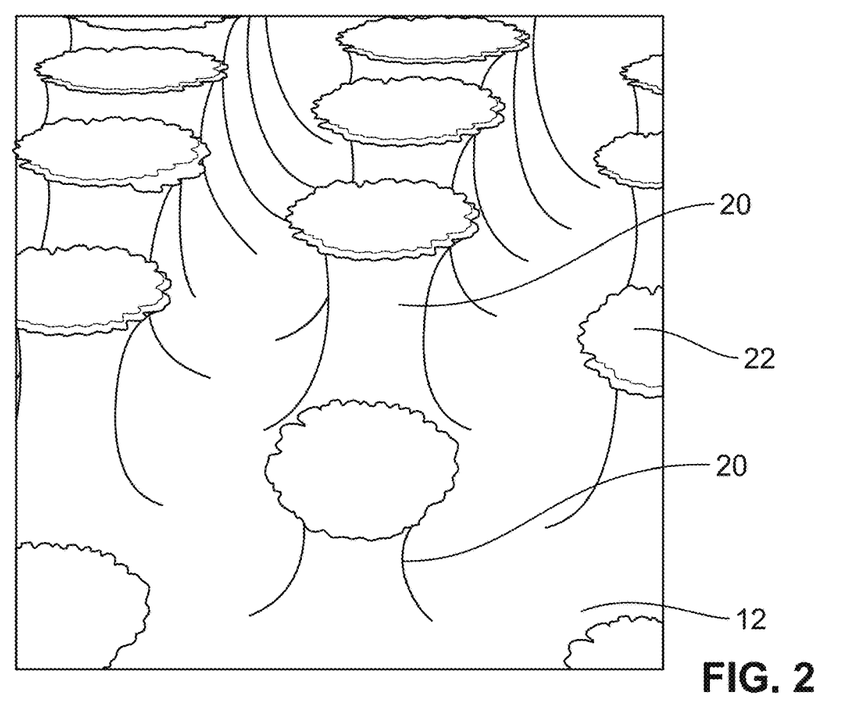
FIG. 2 is a perspective view of an array of mushroom-type male fastener elements extending from a common resin base.
Figure 3:
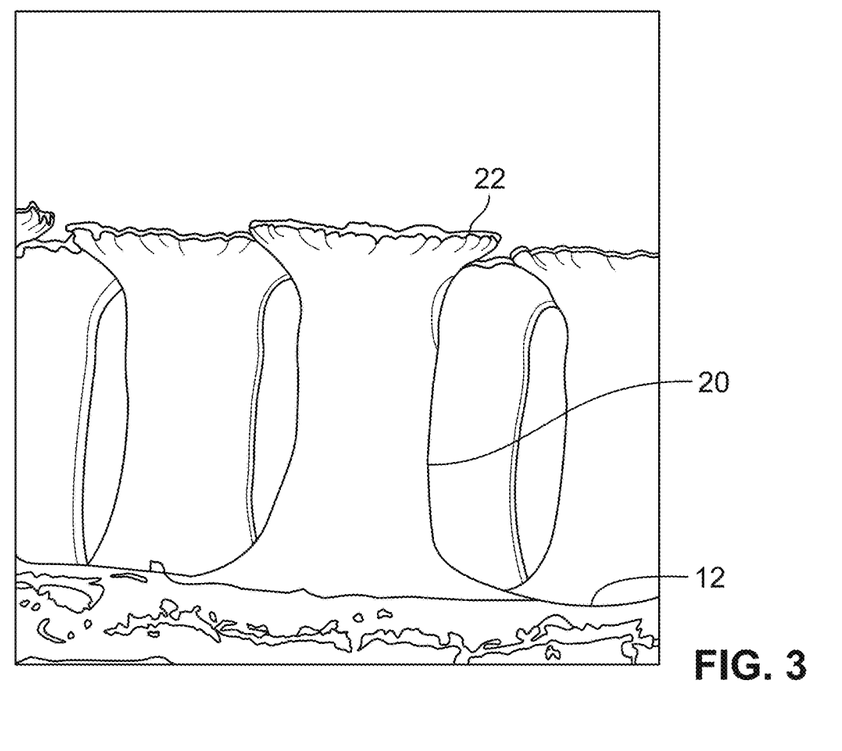
FIG. 3 is a side view of the array of FIG. 2.

Referring next to FIGS. 2 and 3, the fastener elements 14 are formed with discrete circular stems 20 of resin rising integrally from a near surface of base sheet 12. The diameter of each stem 20 may be about the same as the thickness of the base sheet in some cases. The base of each stem blends into the base sheet with a generous radius approximately equal to half of the nominal stem diameter. Above the base radius the stem rises with essentially a constant diameter to a head or cap 22 that extends radially or laterally outward from the stem to overhang the base sheet surface and has an overall diameter about twice the diameter of the stem. As can be seen in FIG. 3, the diameter of each stem 20 is significantly greater than the thickness of the head on the stem. The underside of the head is generally frustoconical or radiused from the stem to the distal edge of the head.

Figure 4:
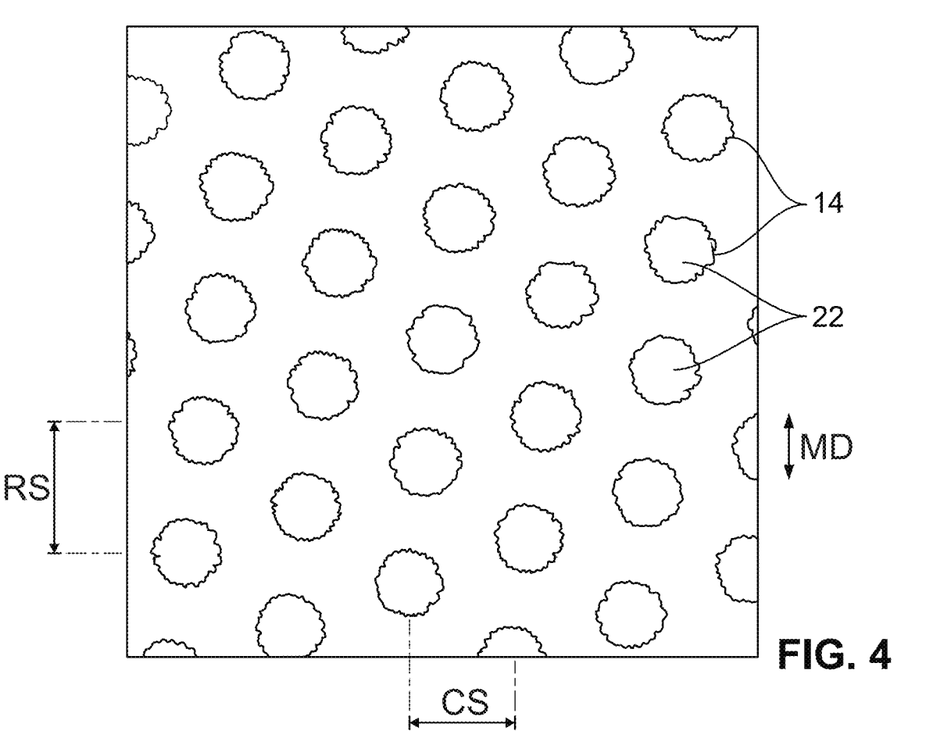
FIG. 4 is a top view of the array of FIG. 2.
Figure 5:
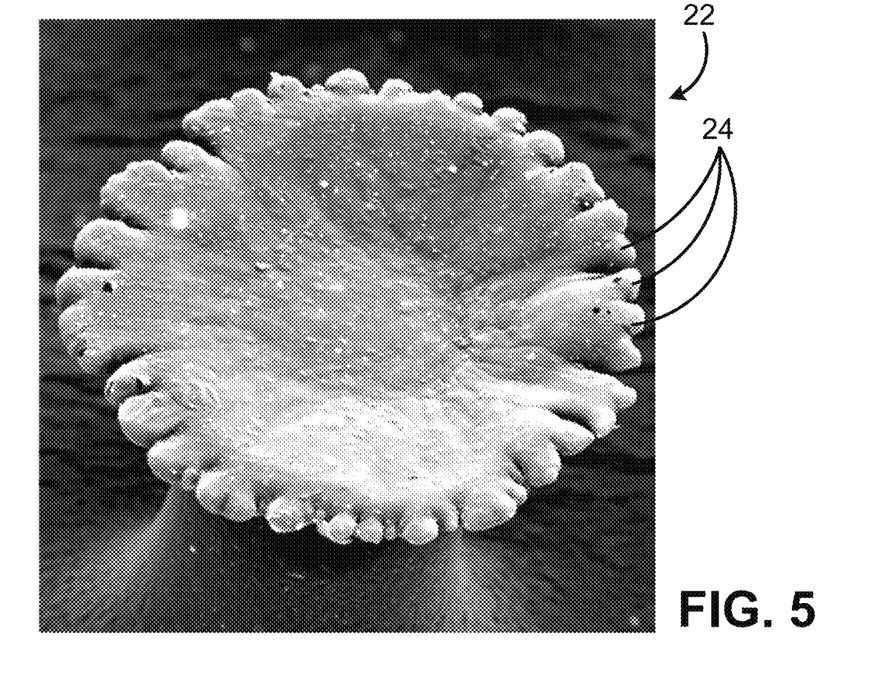
FIG. 5 is a highly magnified, top perspective view of one fastener element.

As shown in FIG. 4, the fastener elements 14 are arranged in a regular array of staggered rows and columns, with the heads 22 of adjacent fastener elements spaced apart to allow fibers to enter the volume between the base sheet and the undersides of the heads so as to be snagged. Arrow MD in FIG. 4 indicates the machine direction of the process that manufactured the photographed product. The column spacing CS and the row spacing RS between fastener elements of a given column are both about twice the nominal head diameter, or in this example about 205 μm. The upper surfaces of the heads are generally flat and parallel to the base sheet, and have a generally circular perimeter. However, when highly magnified as in FIG. 5 it is apparent that the heads 22 do not have exactly circular perimeters. Rather, the head edge has a series of projections extending radially or laterally outward about its perimeter. Given their size and shape, we have come to refer to these projections as toes 24. As evident from the photograph, the width and shape of the toes vary about the perimeter of the head, as does the width and length of the gaps separating adjacent toes. As will be discussed in more detail below, the number, size and shape of toes about the head perimeter do not correspond with any features of the cavity in which the head rim was molded. Rather, the facing sides of adjacent toes are generally curved and have been free-formed rather than formed against a mold surface. Some wider toes each appear to have multiple edge projections, while some appear to neck in width at their base. Moreover, the arrangement of toes is not precisely duplicated across each fastener element, although there are similarities in the overall distribution of toe size across fastener elements of the product.

Figure 6:
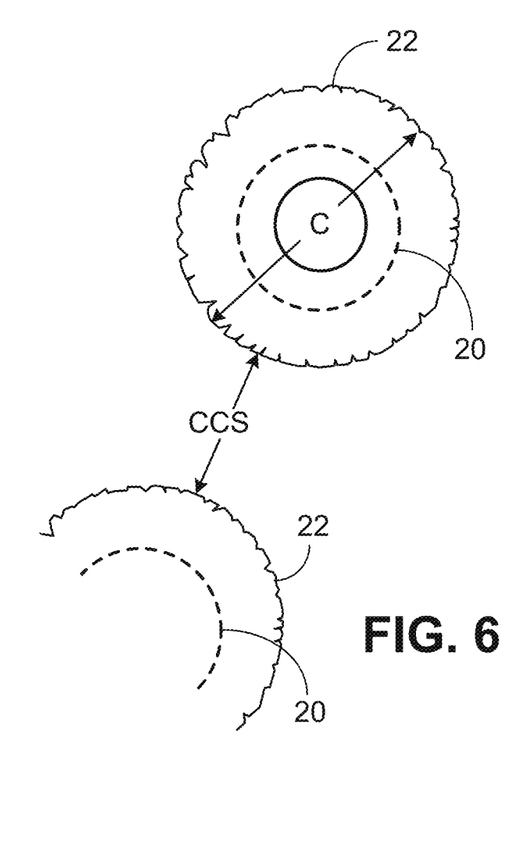
FIG. 6 is a top view of one fastener element and a portion of an adjacent fastener element.

Referring next to FIG. 6, the fastener element head 22 can be said to have a nominal cap diameter 'C' of about 0.077 mm. In various runs of the product, the average cap diameter 'C' was found to range from 0.077 to 0.123 mm. 'C' is measured between the tips of toes on opposite sides of the head and represents the overall diameter of the fastener element head. The separation distance CCS between adjacent heads 22 of the array is about 0.092 mm. In various runs of the product, the average spacing CCS was found to range from 0.078 to 0.111 mm.

Figure 7:
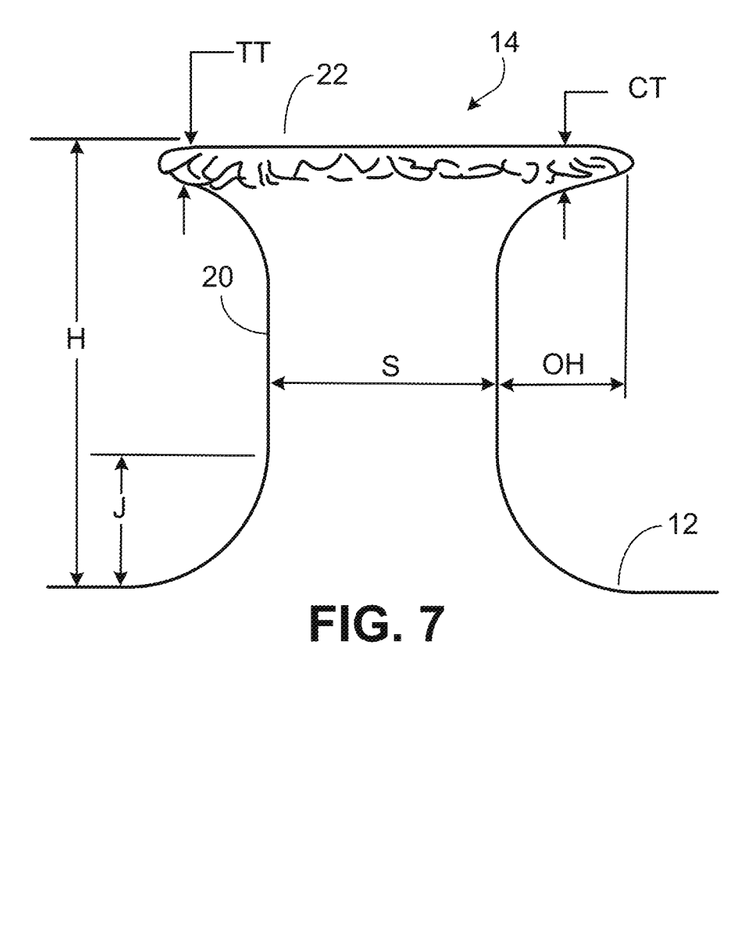
FIG. 7 is a side view of a single fastener element.

As shown in the schematic representation of a fastener element 14 in FIG. 7, the fastener element has an overall height 'H' as measured perpendicular to the base sheet 12 to the upper surface of head 22. In this example 'H' was measured to be 0.126 mm, but in various runs of the product the average height was found to range from 0.126 to 0.170 mm. The stem 20 has a circular cross-section and extends perpendicularly from the base sheet 12. The stem has a nominal diameter 'S' over a length of the stem including its midpoint height, blending into a radius at the base of the stem at a distance 'J' from the base sheet, and blending into a flaring of the underside of the head at the top of the stem. In this example 'S' was measured to be 0.049 mm, but in various runs of the product the average stem diameter was found to range from 0.049 to 0.066 mm. In this example 'J' was measured to be 0.043 mm, but in various runs of the product the average value for 'J' was found to range from 0.032 to 0.051 mm. Distance 'J' is related to the flexibility of the fastener element in response to a lateral load applied at the head, as the stem will tend to bend at or near the lowest extent of the straight shank of the stem.

We have observed how readily the above-described flat-topped mushroom fastener elements can bend in response to lateral loads applied to the head, such as by a finger applying light pressure as it moves across the field. For a given resin, the tendency of the fastener element to bend over in response to a lateral force at the head is related both to the moment arm between the upper surface of the fastener element and its preferred bending point near the base of the stem, and the minimum lateral stem dimension at that point. For ease of analysis, we have defined the Stem Bending Coefficient (SB) as the ratio of H-J to S. Preferably this ratio is between 1.0 and 2.5, more preferably between 1.4 and 2.0. For round stems 'S' is the diameter; for other shapes 'S' should be taken as the minimum lateral dimension. Resins and designs that enable a fastener element so bent over to recover over time to at least close to its original vertical orientation upon removal of the force are preferred. Ideally the upper surface of the fastener element is essentially flat, as opposed to hemispherical, for example.

Referring also back to FIG. 6, the ability of the field to capture and retain fibers that have penetrated the space beneath the heads is related to the head separation distance CCS and the lateral stem dimension 'S'. Ideally the head separation distance CCS is at least 1.2 times, or between 1.2 and 2.0 times, or even between 1.4 and 1.8 times, the stem dimension 'S', particularly in arrays in which rows are staggered such that the stems are staggered and the heads are of similar dimension, such that each head is essentially equally spaced from each of six other heads, such as is shown in FIG. 4. We call this ratio of CCS to S the Spacing Capture Ratio. Maintaining this ratio in the preferred range is also beneficial to the formation and use of molding sleeves configured to mold the fastener elements, as discussed below with respect to FIG. 15.

The head 22 overhangs the stem on each side a distance 'OH' that is approximately half the difference between the head diameter 'C' and the stem diameter 'S' in this example in which both are circular and the stem is centered under the head. In this example OH' was therefore approximately 0.014 mm on each side of the stem. The head can be said to have a nominal thickness CT, measured parallel to the stem at a midpoint of the overhand distance OH. In this example CT was measured to be 17.5 µm, but in various runs of the product the average head thickness was found to range from 0.012 to 0.028 mm. Similarly, toe thickness TT is measured perpendicular to the base sheet at the base of a given toe. The average toe thickness for this example was measured to be 0.0145 mm, but in various runs the average toe thickness ranged from 0.009 to 0.022 mm.

Figure 8:
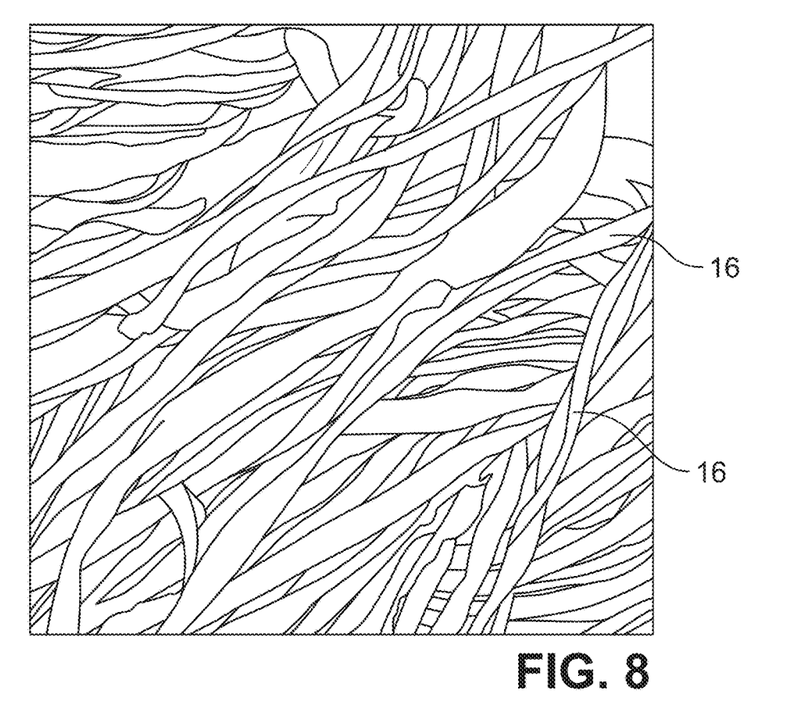
FIG. 8 is a magnified view of a field of microfibers.
Figure 9:
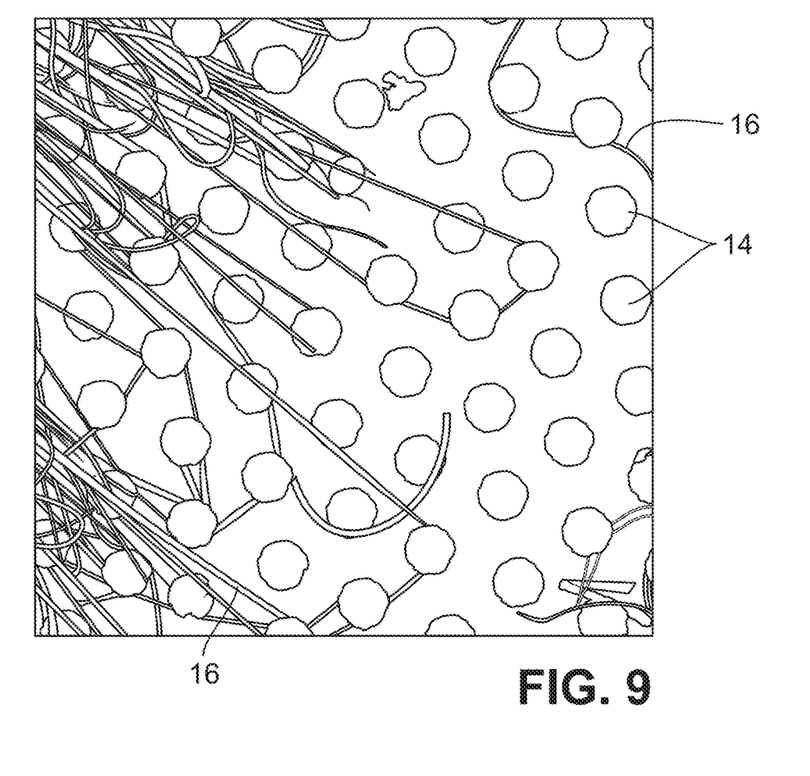
FIG. 9 shows fine fibers engaged with an array of fastener elements.

Referring next to FIG. 8, fibers of a size compatible with the above-described fastener elements to form releasable fastenings include organic fibers such as cotton. Such fibers 16 may have a nominal thickness of only about 5 to 7 µm and be of non-circular cross-section. FIG. 9 shows a field of such fibers 16 snagged by an array of the above-described fastener elements 14. As is evident from this photo, the engagement between discrete fibers and discrete fastener elements is stochastic, and it will be understood that the overall performance and load resistance of the fastening is a function of essentially thousands of discrete engagements. This photo illustrates several different types of engagements, some of which are particularly enabled by the fastener element structural features discussed above.

Figure 10:
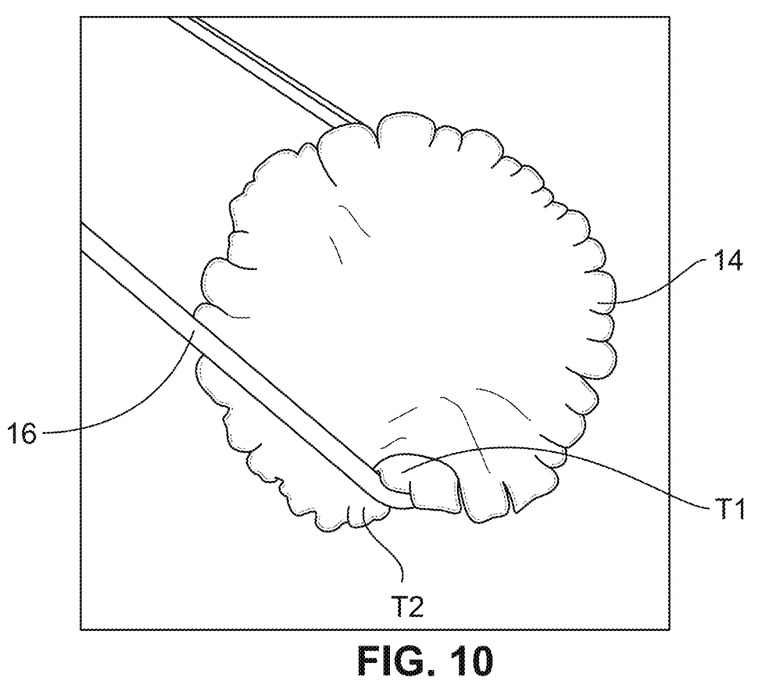
FIG. 10 is an enlarged view of a single engaged fastener element near the center of FIG. 9.

For example, the fiber 16 shown in FIG. 10 engages the visible fastener element by wrapping about the stem (not shown) of the fastener element but crossing the rim at the lower extent of the head in the photo. Where it engages the rim it lifts one toe T1 from the plane of the head, passing under that toe and above an adjacent toe T2. This fiber can be said to engage the edge of the fastener element between adjacent toes, and it is evident that the existence of the toes helps to prevent sliding of the fiber across the rim of the head. In other words, the toes T1 and T2 have a functional effect in the engagement of this fiber 16.

FIG. 10 also illustrates that the edge of the fastener element head can flex upward in response to a fiber-applied point load. For a given resin, this flexibility is related both to the head overhang distance and its thickness. For ease of comparison, we have defined the term Edge Flex Ratio (EF) as the ratio of the difference between head and stem widths to the nominal cap thickness. With reference to the dimensions shown in FIGS. 6 and 7, EF=(C−S)/CT. The Edge Flex Ratio is preferably between 1.0 and 5.0, particularly for relatively flat mushroom heads with edge toes that further increase local flexibility as illustrated in FIG. 10.

Figure 11:
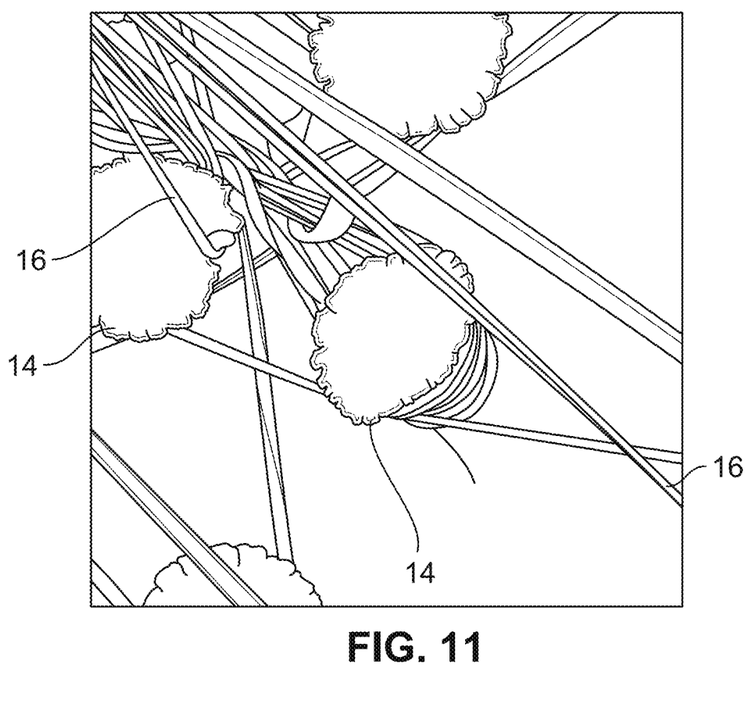
FIG. 11 is an enlarged view of an area near the bottom right corner of FIG. 9.

In the photo shown in FIG. 11, the fastener element 14 near the center of the photo is engaged by several fibers 16 wrapped about its stem under the head, while an adjacent fastener element to the left is engaged by a fiber that has snagged just the head but has not wrapped about the stem. In this latter example, the fiber is caught between adjacent toes of the rim of the head, and tension in the fiber has deflected at least one of the toes to enhance retention of the fiber, thus adding to the overall shear resistance of the fastener.

Figure 12:
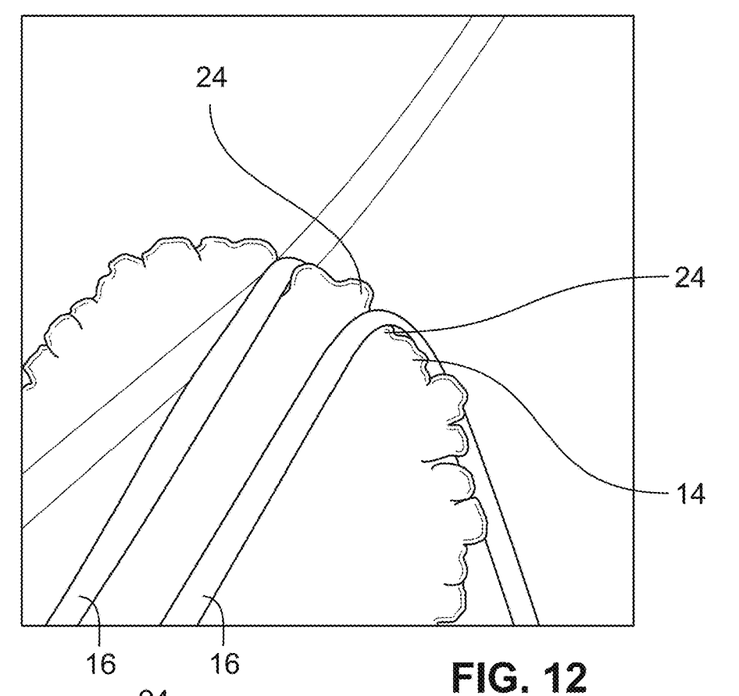
FIG. 12 shows fibers caught between toes of a fastener element head rim.
Figure 13:
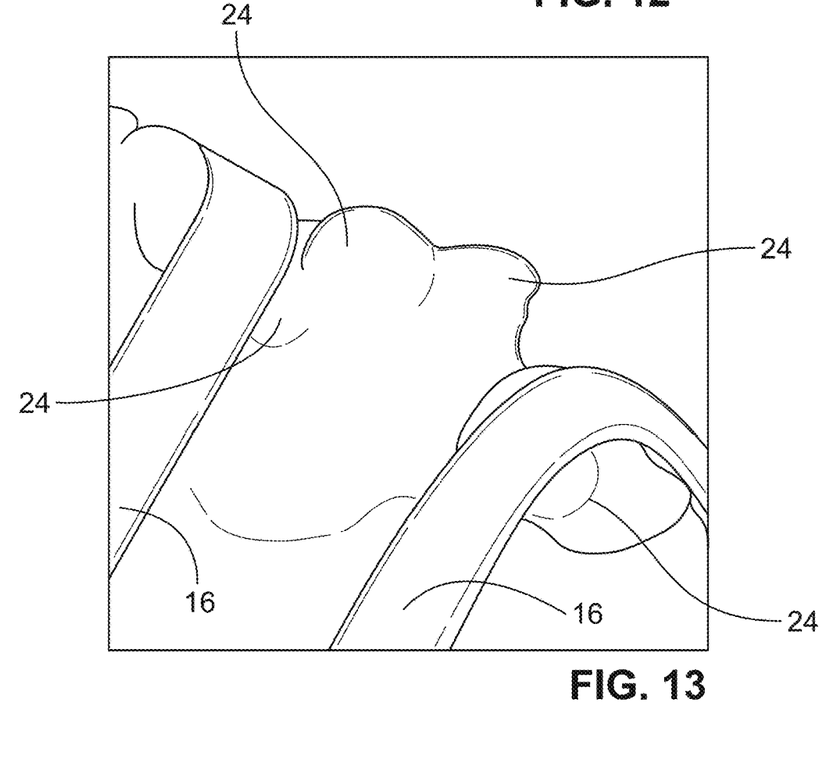
FIG. 13 shows fiber loads bending individual toes out of the plane of the head rim.

FIGS. 12 and 13 show further examples of fibers 16 engaged by just the rim of the fastener element head. In FIG. 12 the fiber 16 on the right is engaged between adjacent toes and tension in the fiber will tend to pull the fiber deeper into engagement, preventing slipping of the fiber along the rim. The fiber on the left has essentially bent one toe upward, out of its plane, as has both fibers 16 shown in FIG. 13.

The fastener elements described above are advantageously flexible in multiple modes in response to a laterally applied head load. The stem will tend to elastically bend over to tilt the head; the rim of the head may flex locally out of its plane to form a local side depression that helps to retain a fiber pulling on the head edge; and individual toes to which the load is applied may bend out of the plane of the rim. We have coined the term Total Flexure Product (TF) as related to the first two of those three flexure modes, as the product of the Stem Bending Coefficient (SB) and the Edge Flex Ratio (EF). Mathematically, TF=SB*EF. The greater either of the two factors, the greater the overall flexure of the fastener element in response to a lateral load applied locally at the edge of the head. For resins suitable for high speed formation of fastener elements, the Total Flexure Product is preferably greater than 3.0, or between 3.0 and 10.0. For the product shown in FIGS. 2-5, the Total Flexure Product was 3.3.

In some cases the relative flexibility of rim edge and stem is important. We define Edge Flex Preference as the ratio of Edge Flex Ratio and Stem Bending Coefficient, or EF/SB. This parameter relates to the relative flexibility of head edge and stem: the higher the value, the more the edge (with or without toes) will flex before the stem itself bends over to help align the load and prevent release. For resistance of shear loads when engaged with fine fibers, Edge Flex Preference of a flat disk-headed fastener element is preferably between 0.3 and 6.0, more preferably between 0.5 and 5.

Figure 14:
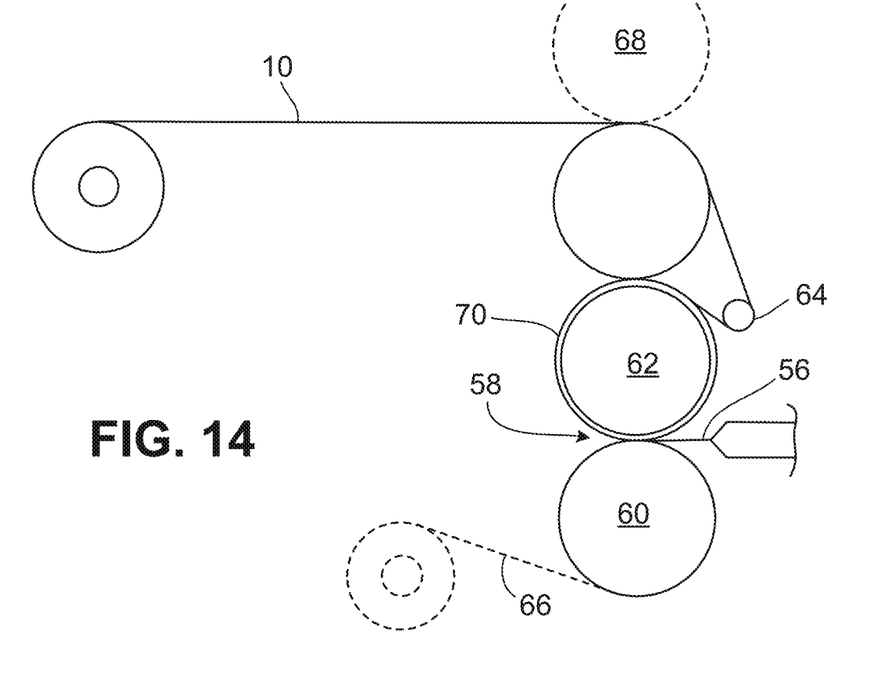
FIG. 14 schematically illustrates a method and apparatus for forming an array of fastener elements with a continuous base sheet.

Referring next to FIG. 14, resin fastener products such as shown in FIG. 1 (with any of the fastener element arrays described above) can be made in a continuous roll-molding process in which molten resin 56 is introduced into a nip 58 between two counter-rotating rolls including a pressure roll 60 and a mold roll 62 that defines cavities in the shape of the above fastener elements. Pressure in nip 58 forces the resin into the cavities, where it solidifies as contiguous resin solidifies on the surface of the roll before being stripped off of the mold roll by being passed around a stripper roll 64 and then spooled for storage. In some cases a preformed web 66 is introduced to the nip with the resin, such that while some of the resin is filling the cavities to form the fastener elements, resin forming the base sheet is laminated directly to the web surface, such as by the resin intermingling with surface features of the web, partially penetrating the web surfaces in the case of a fibrous web. The spooled product in that case comprises the web with the base sheet of resin on one side of the web, and the array of fastener elements extending from the base sheet. The resin can be introduced to the nip in discontinuous volumes to form the base sheet in separate islands or patches or width-wise continuous lanes, each bearing fastener elements. The resin can also be introduced in multiple, spaced apart lanes across the width of the web, to form a fastener product with continuous, longitudinal lanes of fastener elements separated by lanes of exposed web surface.

The male touch fastener products shown in FIGS. 2-5 and 9-13 were molded from PPC7650 polypropylene, available from TOTAL, with 5% added whitener. The tape was continuously processed as shown in FIG. 14, at a line speed of 58 meters per minute, resulting in a tape with an overall weight of 100 grams per square meter and an overall thickness, including the base and fastener elements, of 0.23 millimeter.

It is preferred that the heads of the fastener elements be molded in finished form in the cavities of mold roll 62. However, in some cases it may be necessary to slightly flatten the heads after molding, such as by engaging the upper surfaces of the heads with a heated roller 68 that plastically deforms the heads to increase their flatness. Preferably, the heat and pressure applied by roll 68 is sufficient to flatten the upper head surface without melting away the toe structures formed about its periphery. The heads shown in the photos described above have, for example, been slightly flattened by such a roll after being pulled from their molding cavities. The effect of the flattening can be seen, for example, in FIG. 2, from which it can be seen that the outer rim area of the upper surface of each fastener element, containing the toes, lies in a plane generally perpendicular to the stem, while the central portion of the upper surface—that portion which may not have engaged roll 68—forms a shallow depression.

Figure 15:
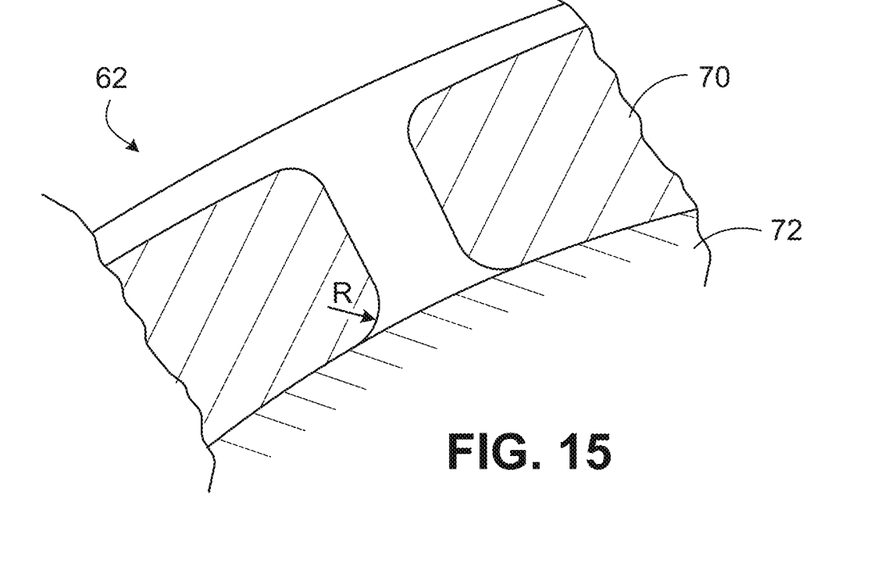
FIG. 15 shows a cross-section of an individual cavity in which a fastener element or fastener element preform is molded.

Referring to FIG. 15, cavities shaped to form the fastener elements described herein can be defined in a sleeve 70 fit tightly to an outer surface of a cylindrical core 72 of mold roll 62, with the cavities extending all of the way through the sleeve such that the flat upper surfaces of the fastener element heads are formed on the outer core surface. Methods of laser cutting using a pulsed fiber laser, tilting the beam axis as it travels about the cavity perimeter, are capable of forming cavities of this shape and size in stainless steel, in some cases followed by a light etch. Screens with such cavities can also be made by electroforming techniques. Fastener element heads may be formed in rotationally symmetric cavities, such that the cross-section of the head-forming portion of the cavity as shown is similar in any plane containing the centerline of the stem. In other words, the toes may be formed within a smooth and continuous rim cavity that tapered to a sharp edge at the surface of core 72, and the inter-toe surfaces and bounded crevices are not themselves determined or formed by specific mold surfaces or features. The cavity surface is generously radiused between the portion forming the narrowest part of the stem and the core surface, which essentially forms a tangent to the arc of the cavity surface. The radius 'R' defined by this surface is preferably more than half the narrowest lateral extent of the cavity, and for molding the underside surface of the heads shown in FIG. 3 was about 50 µm, for example. As the resin is pressed at high rate into this ever-narrowing rim portion of the cavity, the toes form. As can be seen from the curved outer toe surfaces in the photographs discussed above, the resin flow eventually freezes and forms non-molded surfaces at the distal toe ends.

One hypothesis concerning why the resin flow forming the head rim splits into discrete flows as it approaches the distal extent of the rim cavity, with each flow chilling to form a separate toe structure, is that the rate of chill accelerates as the resin cross-section narrows, while air trapped in the rim cavity increasingly resists the advancing flow, causing the rim cavity to incompletely fill. As the solidified skin of the edge of the flow stretches circumferentially to fill the cavity, molten resin behind the skin breaks through in discrete regions to push forward as a toe, chilling and solidifying without merging with adjacent flows. Whatever the mechanism involved, we have found the formation of toes within the cavities and processing parameters described above to be quite repeatable within standard process control tolerances.

Figure 16:
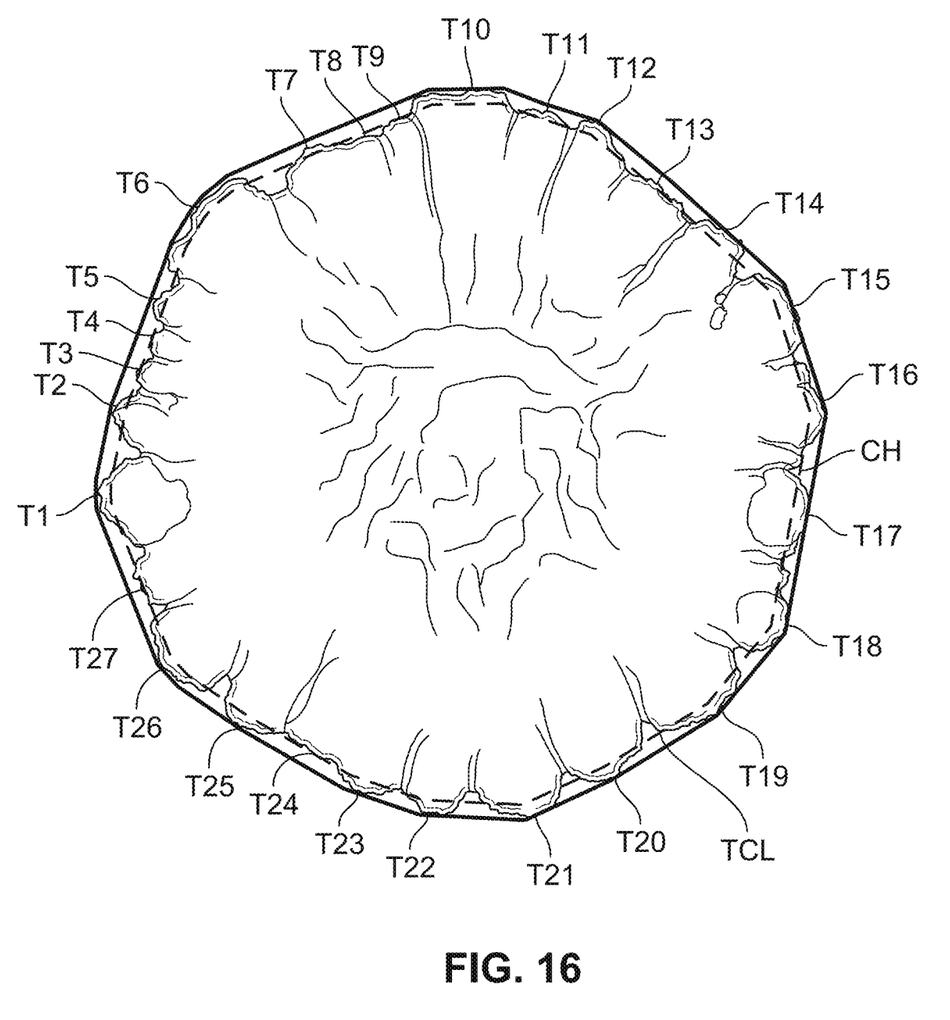
FIG. 16 illustrates the process of counting toes about a head perimeter.

With reference to FIG. 16, we use the following procedure to determine the number of toes about the periphery of a fastener element head, and we use the word 'toe' with reference to this method of determining whether a particular projection is or is not a toe. First, an image of the fastener element head is obtained, looking directly down at the upper surface of the head (i.e., in a direction perpendicular to the base sheet). Next, a line is drawn about the head representing the convex hull of the head perimeter. In this figure such a line is labeled CH. A toe-count line is then drawn spaced inside the convex hull line by a distance equal to five percent of the longest distance from the head area centroid to the convex hull line. The toe count line is labeled TCL in the figure and represented as a dashed line. Next, the discrete positions about the head rim where the perimeter extends to within the TCL are counted. Such spaces are only counted if the width of the space (i.e., the inter-toe space) at the TCL is less than the width of the head perimeter along the TCL on each side of the space before reaching another space. In other words, points at which one can see through the head inside the TCL are counted. The number of toes is taken to be equal to the number of such spaces. Note that in FIG. 16 the thickness of the TCL is increased for visibility, obscuring open space between some of the toes. In this example, 27 discrete toes labeled T1-T27 were found between corresponding open spaces.

Figure 17:
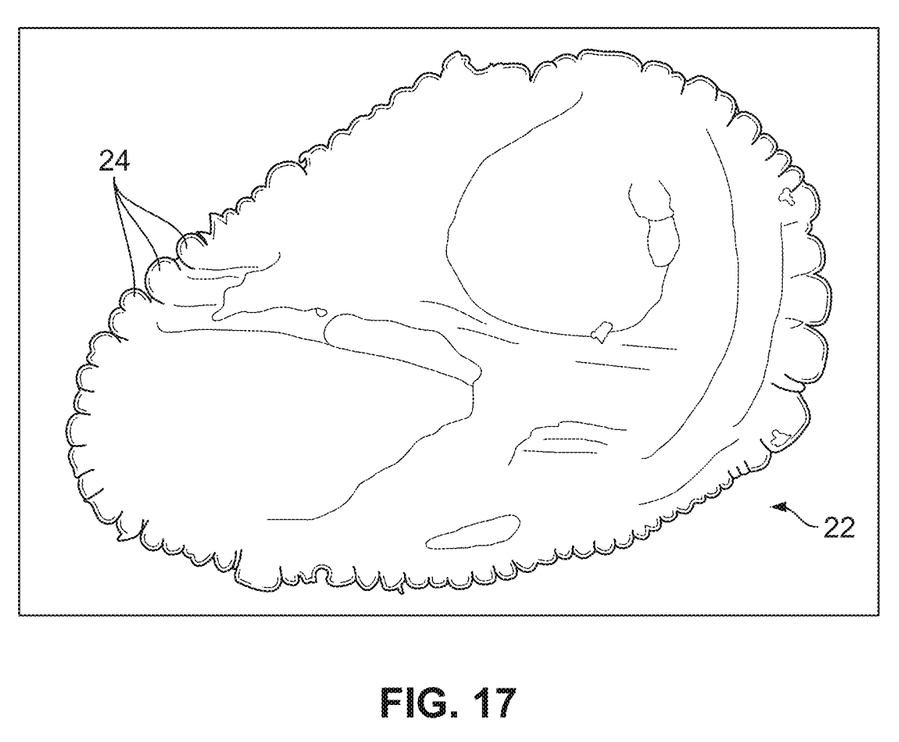
FIG. 17 is a top view of a non-circular touch fastener element with toes.

Referring next to FIG. 17, cavities may be shaped to form non-circular heads with edge toes. The head 22 shown in this figure was formed in a screen cavity of similar shape to the one shown in FIG. 15, but with a non-circular stem cross-section and a correspondingly non-circular, smooth opening held against a cylindrical core surface. As a scale reference, the widest lateral extent of the head was approximately 0.46 millimeter and the narrowest lateral extent approximately 0.28 millimeter. As seen, toes 24 were formed about at least much of the perimeter of the head and survived the cavity extraction process to define crevices for snagging microfibers.

Flexible products may be molded as continuous sheets with the fastener elements as described above, and then plastically stretched within their plane after molding to reduce the thickness of sheet and decrease the density of the fastener elements. Stretching may be done laterally to improve the tear resistance of the sheet along the longitudinal direction, or biaxially. The product may be stretched laterally to increase its area by up to a factor of seven, for example.

We have found samples of fastener product produced according to the above method to be particularly soft to the touch in comparison with certain other touch fasteners considered to exhibit softness. To obtain objective measurements of this property, we subjected representative samples of the product shown in FIGS. 2-5 to testing on a Toccare automated testing system from SynTouch Inc. of Montrose, Calif. Sample preparation and testing was performed in accordance with the Toccare User Manual, Software Version 5.0 (2018), with the probe movement aligned with the machine direction of each of five samples. The mean Toccare micro-texture coarseness measurement of the representative samples was 21.6, with a standard deviation of 3.8. The mean Toccare micro-texture roughness measurement of the representative samples was 26.3, with a standard deviation of 0.8. Also tested were five samples each of the fastener product shown in FIGS. 1A-4 of U.S. patent application Ser. No. 15/680,447 (the contents of which are specifically incorporated herein by reference as they relate to the materials and dimensions of the illustrated embodiment), a molded polypropylene palm-tree hook sold by Velcro USA Inc. under the designation HTH 819 for use in disposable diapers, and a touch fastener sold by Gottlieb Binder GmbH under the designation MicroPlast. These other touch fasteners exhibited mean Toccare micro-texture coarseness in the machine direction of 49.4, 56.0 and 34.7, respectively, and mean Toccare micro-texture roughness in the machine direction of 64.6, 83.0 and 49.6, respectively. These measurements, taken at 20 degrees C. and 30 percent relative humidity, were consistent with our subjective impression that the product produced as described above was significantly softer to the touch.

While a number of examples have been described for illustration purposes, the foregoing description is not intended to limit the scope of the invention, which is defined by the scope of the appended claims. There are and will be other examples and modifications within the scope of the following claims.

What is claimed is:

1. A male touch fastener product, comprising
a resin surface;
an array of spaced-apart male touch fastener elements carried on the surface, each touch fastener element comprising
a stem extending from the surface; and
a head disposed at a distal end of the stem, and forming with the stem and the surface a contiguous mass of resin, the head extending laterally from the stem to a distal edge overhanging the surface;
wherein the distal edge comprises multiple toes extending laterally outward and varying in shape and size about the edge, with adjacent toes having facing, free-form resin surfaces defining crevices therebetween, the crevices being narrower than the adjacent toes.

2. The male touch fastener product of claim 1, wherein the array comprises at least one row of the male touch fastener elements arranged such that heads of adjacent fastener elements of the row are spaced from each other a distance that is between 1.2 and 2.0 times a minimum lateral dimension of the stems of the adjacent fastener elements.

3. The male touch fastener product of claim 1, wherein for at least most of the fastener elements of the array, the ratio of a difference between the overall lateral extent of the head and a minimum lateral extent of the stem to the overhang midpoint thickness is between 1.0 and 5.0.

4. The male touch fastener product of claim 1, wherein the stem has a minimum lateral extent and a bend height defined as the perpendicular distance from the resin surface to a lowermost occurrence of the minimum lateral extent, and wherein for at least most of the fastener elements of the array, the product of Stem Bending Coefficient and Edge Flex Ratio is between 3.0 and 10.0, where Stem Bending Coefficient is a ratio of a difference between overall height and bend height to the minimum lateral extent of the stem, and Edge Flex Ratio is a ratio of a difference between the overall lateral extent of the head and the minimum lateral extent of the stem to the overhang midpoint thickness.

5. The male touch fastener product of claim 1, wherein the stem has a minimum lateral extent and a bend height defined as the perpendicular distance from the resin surface to a lowermost occurrence of the minimum lateral extent, and wherein at least three adjacent fastener elements each has a Stem Bending Coefficient of between 1.4 and 2.0, where Stem Bending Coefficient is a ratio of a difference between overall height and bend height to the minimum lateral extent.

6. The male touch fastener product of claim 1, wherein the edge has between 5 and 50 toes.

7. The male touch fastener product of claim 1, wherein at least one of the crevices is defined between toe surfaces that are generally parallel over at least 30 percent of an overall length of the crevice.

8. The male touch fastener product of claim 1, wherein the stem has a molded peripheral surface.

9. The male touch fastener product of claim 8, wherein the head has a molded underside surface.

10. The male touch fastener product of claim 1, wherein the head is disc-shaped.

11. The male touch fastener product of claim 1, wherein the head has an essentially flat upper surface.

12. The male touch fastener product of claim 1, wherein the fastener elements extend to an overall height from the resin surface of between about 0.08 and 0.3 millimeter.

13. The male touch fastener product of claim 1, wherein the head has an upper surface defining a central depression.

14. The male touch fastener product of claim 1, wherein the head has an underside surface that defines a curve extending from a narrowest portion of the stem to the rim of the head.

15. The male touch fastener product of claim 1, wherein the array comprises staggered rows of fastener elements.

16. The male touch fastener product of claim 15, wherein each head is essentially equally spaced from each of six other heads.

* * * * *